(12) United States Patent
Olmstead et al.

(10) Patent No.: US 9,053,379 B2
(45) Date of Patent: Jun. 9, 2015

(54) SINGLE ARCH PORTAL SCANNER AND METHOD OF SCANNING

(71) Applicant: Datalogic ADC, Inc., Eugene, OR (US)

(72) Inventors: Bryan L. Olmstead, Eugene, OR (US); Alan Shearin, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 14/504,739

(22) Filed: Oct. 2, 2014

(65) Prior Publication Data
US 2015/0097032 A1 Apr. 9, 2015

Related U.S. Application Data

(60) Provisional application No. 61/887,088, filed on Oct. 4, 2013.

(51) Int. Cl.
*G06K 7/00* (2006.01)
*G06K 7/10* (2006.01)
*G07G 1/00* (2006.01)

(52) U.S. Cl.
CPC .......... *G06K 7/1096* (2013.01); *G06K 7/10722* (2013.01); *G06K 7/10762* (2013.01); *G07G 1/0045* (2013.01)

(58) Field of Classification Search
USPC .......... 235/440, 454, 462.01, 462.13, 462.25, 235/462.43; 705/16
See application file for complete search history.

(56) References Cited

U.S. PATENT DOCUMENTS

| 4,939,355 | A |   | 7/1990  | Rando et al. |
| 5,019,694 | A |   | 5/1991  | Collins |
| 5,495,097 | A |   | 2/1996  | Katz et al. |
| 5,525,786 | A | * | 6/1996  | Dumont .................... 235/462.14 |
| 6,189,784 | B1 |   | 2/2001  | Williams et al. |
| 6,330,973 | B1 |   | 12/2001 | Bridgelall et al. |
| 6,332,577 | B1 | * | 12/2001 | Acosta et al. ............ 235/472.01 |
| 6,446,870 | B1 |   | 9/2002  | Rando |

(Continued)

FOREIGN PATENT DOCUMENTS

| JP | 11-203423 A  | 7/1999 |
| JP | 2002-029608 A | 1/2002 |

OTHER PUBLICATIONS

SCDigest.com article, RFID and AIDC News: "New Kroger Bar Code Scan Tunnel . . . " Jan. 11, 2011 http://www.scdigest.com/ontarget/11-01-11-2.php?cid=4083 Visited Jan. 25, 2011.

(Continued)

*Primary Examiner* — Allyson Trail
(74) *Attorney, Agent, or Firm* — Stoel Rives LLP

(57) ABSTRACT

A scanning system for data reading, and related methods of use, the scanning system including a portal scanner and a conveyor for transporting items. The scanner includes a generally U-shaped scanner housing and a plurality of data readers arranged within the scanner housing for reading data on various surfaces of an item being transported through the portal scanner. The scanning system may also include a bottom scanner positioned beneath the conveyor, the bottom scanner having a view volume directed through a gap in the conveyor for reading a bottom surface of the item through the gap as the item passes over the gap. In some embodiments, the scanning system may further include one or more light curtains configured for determining a height dimension of the item and/or a position of the item.

16 Claims, 15 Drawing Sheets

(56) References Cited

U.S. PATENT DOCUMENTS

| | | |
|---|---|---|
| 6,484,066 B1 | 11/2002 | Riess et al. |
| 6,837,428 B2 | 1/2005 | Lee et al. |
| 6,899,272 B2 | 5/2005 | Krichever |
| 7,000,839 B2 | 2/2006 | Good et al. |
| 7,044,370 B2 | 5/2006 | Bellis, Jr. et al. |
| 7,325,729 B2 | 2/2008 | Crockett et al. |
| 7,398,927 B2 | 7/2008 | Olmstead |
| 7,527,205 B2 | 5/2009 | Zhu et al. |
| 7,720,194 B2 | 5/2010 | Connelly et al. |
| 7,905,410 B2 * | 3/2011 | Good et al. .............. 235/462.01 |
| D668,656 S | 10/2012 | Hoskinson et al. |
| 2006/0261157 A1 | 11/2006 | Ostrowski et al. |
| 2007/0181685 A1 | 8/2007 | Zhu et al. |
| 2009/0060259 A1 * | 3/2009 | Goncalves .................... 382/100 |
| 2009/0134221 A1 | 5/2009 | Zhu et al. |
| 2010/0163626 A1 | 7/2010 | Olmstead |
| 2010/0163627 A1 | 7/2010 | Olmstead |
| 2010/0163628 A1 | 7/2010 | Olmstead |
| 2010/0217678 A1 | 8/2010 | Goncalves |
| 2012/0150589 A1 * | 6/2012 | Xian et al. ................... 705/7.42 |
| 2012/0205448 A1 | 8/2012 | Hoskinson et al. |
| 2013/0020391 A1 | 1/2013 | Olmstead et al. |
| 2013/0020392 A1 | 1/2013 | Olmstead et al. |

OTHER PUBLICATIONS

PCT Application No. PCT/US2012/022438: International Search Report Sep. 5, 2012; Preliminary Report on Patentability Aug. 8, 2013.

Extended European Search Report for EP Patent Application No. 12 739 344.5 dated Sep. 19, 2014, 6 pages.

* cited by examiner

SINGLE ARCH PORTAL SCANNER AND METHOD OF SCANNING

RELATED APPLICATION DATA

This application is a nonprovisional of and claims priority under 35 U.S.C. §119(e) to U.S. Provisional Application No. 61/887,088 filed on Oct. 4, 2013, the disclosure of which is hereby incorporated by reference.

BACKGROUND

The field of this disclosure relates generally to data reading systems, and more particularly to automated data reading systems where items are transported through a read region of one or more data readers at which the items are identified by reading optical codes, RFID (radio frequency identification) tags, other identifiers carried on the items, or by capturing and processing images of the items.

Data reading systems are used to read optical codes, acquire data, and/or capture images to identify an item. Data reading devices are well known for reading UPC and other types of optical codes on packages, particularly in retail stores. One common data reader in such systems is an imaging reader that employs an imaging device or sensor array, such as a CCD (charge coupled device) or CMOS (complementary metal oxide semiconductor) device. Imaging readers can be configured to read both 1-D and 2-D optical codes, as well as other types of optical codes or symbols and capture images of other items. When an imaging reader is used to read an optical code, an image of the optical code or portion thereof is focused onto a detector array. Though some imaging readers are capable of using ambient light illumination, an imaging reader typically utilizes a light source to illuminate the item being read to provide the required signal response in the imaging device.

An imager-based reader utilizes a camera or imager to generate electronic image data, typically in digital form, of an optical code. The image data is then processed to find and decode the optical code. For example, virtual scan line techniques are known techniques for digitally processing an image containing an optical code by looking across an image along a plurality of lines, typically spaced apart and at various angles, somewhat similar to the scan pattern of a laser beam in a laser-based scanner. It should be noted that a camera is typically a combination of a lens and an imaging device/sensor array, but the terms imager and camera may be used interchangeably herein.

Imager-based readers often can only form images from one perspective—usually that of a normal vector out of the face of the imager. Such imager-based readers therefore provide only a single point of view, which may limit the ability of the reader to recognize an optical code in certain circumstances. For instance, because the scan or view volume of an imager in an imager-based reader is typically conical in shape, attempting to read a barcode or other image in close proximity to the scanning window (reading "on the window") may be less effective than with a basket-type laser scanner. Also, when labels are oriented such that the illumination source is reflected directly into the imager, the imager may fail to read properly due to uniform reflection washing out the desired image entirely, or the imager may fail to read properly due to reflection from a textured specular surface washing out one or more elements of the barcode. This effect may cause reading of shiny labels to be problematic at particular reflective angles. In addition, labels oriented at extreme acute angles relative to the imager may not be readable. Lastly, the label may be oriented on the opposite side of the package with respect to the camera view, causing the package to obstruct the camera from viewing the barcode.

Thus, better performance could result from taking images from multiple perspectives. Imager-based readers that generate multiple perspectives are known. For example, one such reader is disclosed in U.S. Pat. No. 7,398,927 which describes an embodiment having two cameras to collect two images from two different perspectives for the purpose of mitigating specular reflection. In addition, U.S. Pat. No. 6,899,272 discloses a data reader that utilizes two independent sensor arrays pointed in different orthogonal directions to collect image data from different sides of a package.

However, in some multiple-camera imager-based readers that employ spatially separated cameras, the system may require multiple circuit boards and/or mounting hardware and space for associated optical components. Such features and components may increase the expense of the data reading system, complicate the physical design, and increase the size and bulk of the data reading system. The present inventors have, therefore, determined that it would be desirable to provide a data reading system with improved performance features, while maintaining a lean profile to minimize cost and size (e.g., bulk) of the data reading system.

Additional aspects and advantages will be apparent from the following detailed description of preferred embodiments, which proceeds with reference to the accompanying drawings. Understanding that the drawings depict only certain embodiments and are not, therefore, to be considered limiting in nature, these embodiments will be described and explained with additional specificity and detail with reference to the drawings.

DETAILED DESCRIPTION OF PREFERRED EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

In the following description of the figures and any example embodiments, it should be understood that an automated checkout system in a retail establishment is merely one use for such a system and should not be considered as limiting. An automated checkout system with the characteristics and features described herein can alternatively be used, for example, in an industrial location such as a parcel distribution center (e.g., postal), warehouse, or luggage distribution center. In addition, though the portal scanner 100 and the bottom scanner 50 may be described in greater detail as an optical code reader or data reader, the portal scanner 100 and/or bottom scanner 50 may alternately comprise an RFID reader, an image or object recognition reader, an optical code reader, or combinations thereof.

In addition, it should be understood that reference to a "data reader" in the specification is used in an expansive sense to describe a data reader that may include a camera or other imaging system, a microprocessor, a decoding unit, and a controller for communicating data to other data readers or external systems. However, the term "data reader" is not intended to be limited to require each of these components. In some embodiments, a data reader may include a camera or other imaging system, and may not include a processor, decoding unit, and the controller. These components may be entirely external to the data reader itself, such as being a part an external system with which the data reader communicates. For example, the data reader may be a camera that obtains images of the item and communicates or transmits those images to an external database for decoding and processing. While it is generally understood that a camera is typically a combination of a lens and an imaging device or sensor array, the terms imager (or imaging system) and camera may be used interchangeably herein.

Figure 1:
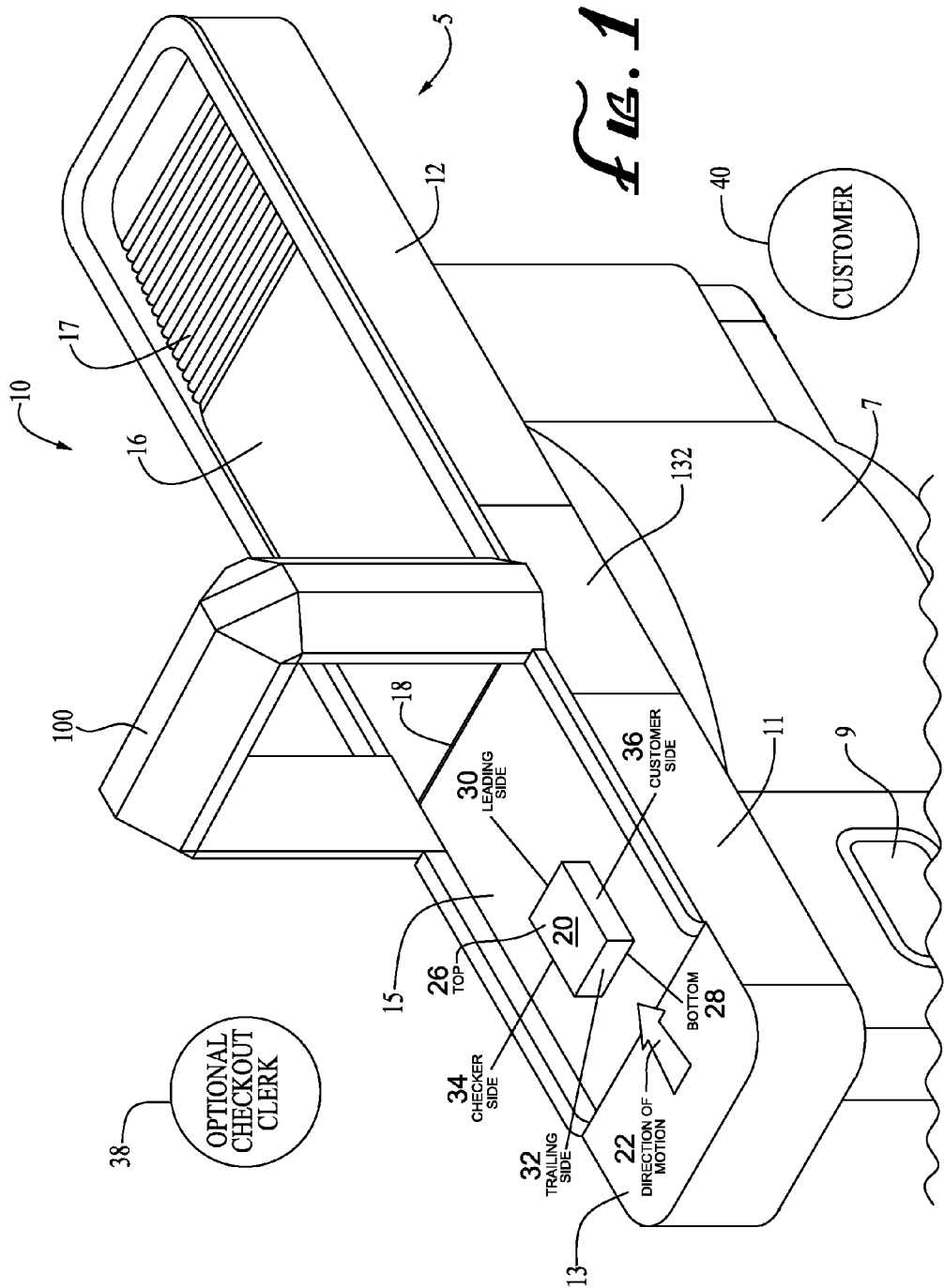
FIG. 1 is an isometric view of an automated checkout system including a portal scanner installed on a checkstand, according to one embodiment.
Figure 2:
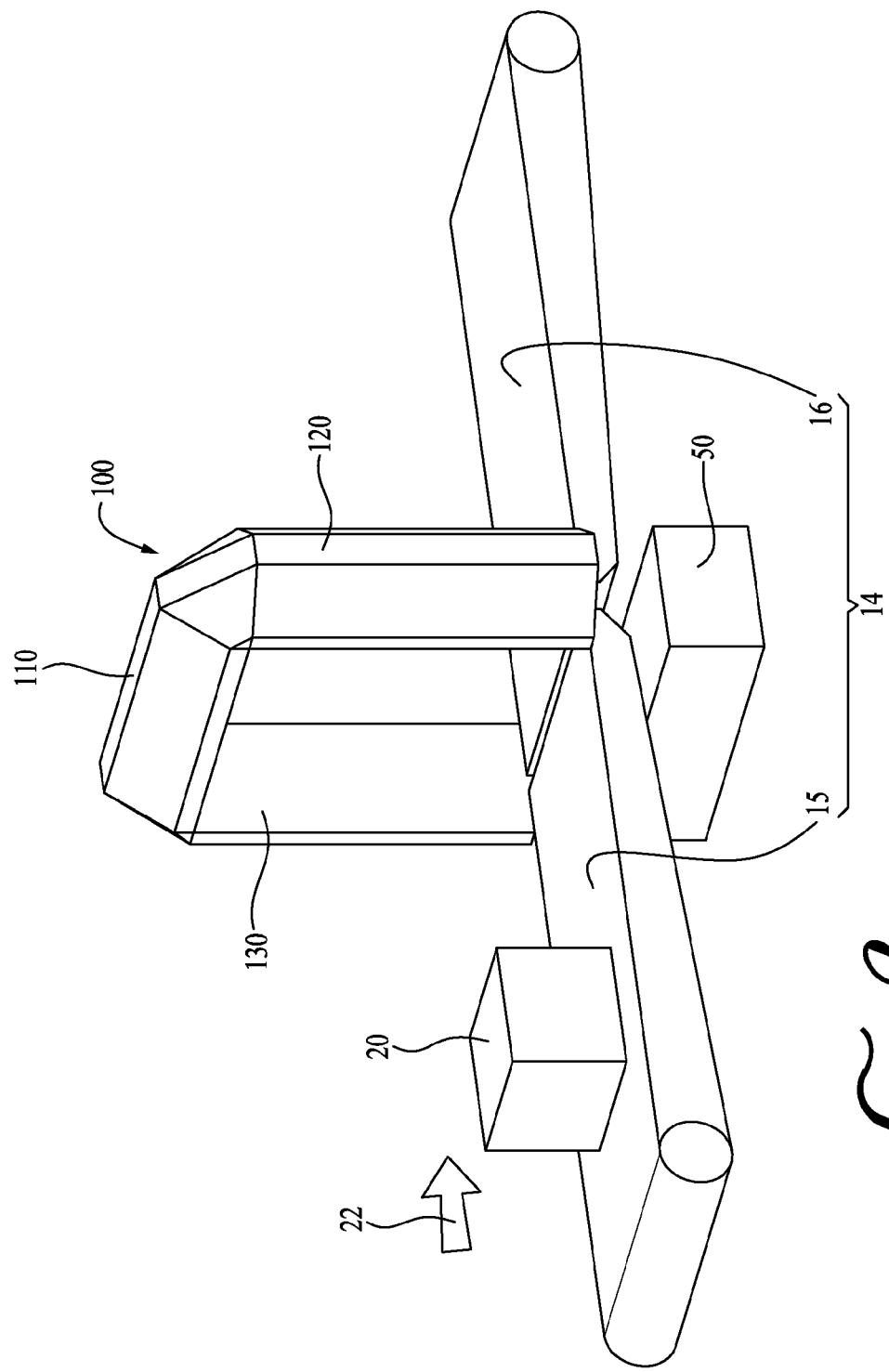
FIG. 2 is a simplified schematic diagram of the automated checkout system of FIG. 1 illustrating a bottom data reader beneath a conveyor and an item transported through the portal scanner.

FIGS. 1-2 illustrate an automated checkout system 10 that may be used to read and process an optical code (e.g., a barcode label) or capture other target data (RFID tags, images, etc.) from various surfaces of an item 20 during a checkout process, such as in a retail establishment or supermarket. The automated checkout system 10 includes a portal scanner 100 attached to a chassis 132. The chassis 132 is installed at a checkstand 5 that may be used at a high-volume retail establishment, such as a grocery store or big-box store. The automated checkout system 10 also includes a conveyor system 14 having a front conveyor section (or leading/input conveyor) 15 and a rear conveyor section (or trailing/exit conveyor) 16 for transporting items 20 through a read region of the portal scanner 100. The checkstand 5 includes a base or stand 7 having a front end section 11 for supporting the input conveyor 15 and a rear end section 12 for supporting the exit conveyor 16. The front end section 11 has a feed-in shelf 13 on which items 20 may be laid prior to and in preparation for placing on the input conveyor 15. The lower section of the stand 7 is shown with a bottom of basket/cart detector 9 that detects and possibly identifies items 20 on the bottom shelf of a grocery basket or cart. Such detection may be used to alert the customer and/or store personnel that potentially forgotten items 20 remain in the basket, or to otherwise process items 20 that are either large or bulky and left on the bottom shelf of the grocery basket/cart.

In some embodiments, the input conveyor 15 and the exit conveyor 16 are spaced apart by a gap 18. In such embodiments, the automated checkout stand 10 further includes a bottom scanner 50 attached to or otherwise supported by the chassis 132, and positioned to read a bottom side 28 of the item 20 through the gap 18 (see FIG. 3). In some embodiments, the input conveyor 15 may be slightly raised in relation to the exit conveyor 16 (i.e., the input conveyor terminates at a slightly raised elevation proximate and relative to the exit conveyor) such that when the item 20 transitions from the input conveyor 15 to the exit conveyor 16, the item 20 crosses the gap 18 and tilts or drops slightly onto the exit conveyor 16. In other embodiments, the bottom scanner 50 and the gap 18 may be omitted, and a single, continuous conveyor 14 (instead of separated conveyor sections 15, 16) may be employed.

It should be understood that although the transport systems are generally described with respect to belt-type conveyors, other conveyor/transport systems may be employed such as: inclined slides, vibratory conveyors, roller conveyors, turntables, blower systems (the items driven along a surface via a blower), combinations thereof, or other suitable transport systems.

Figure 3:
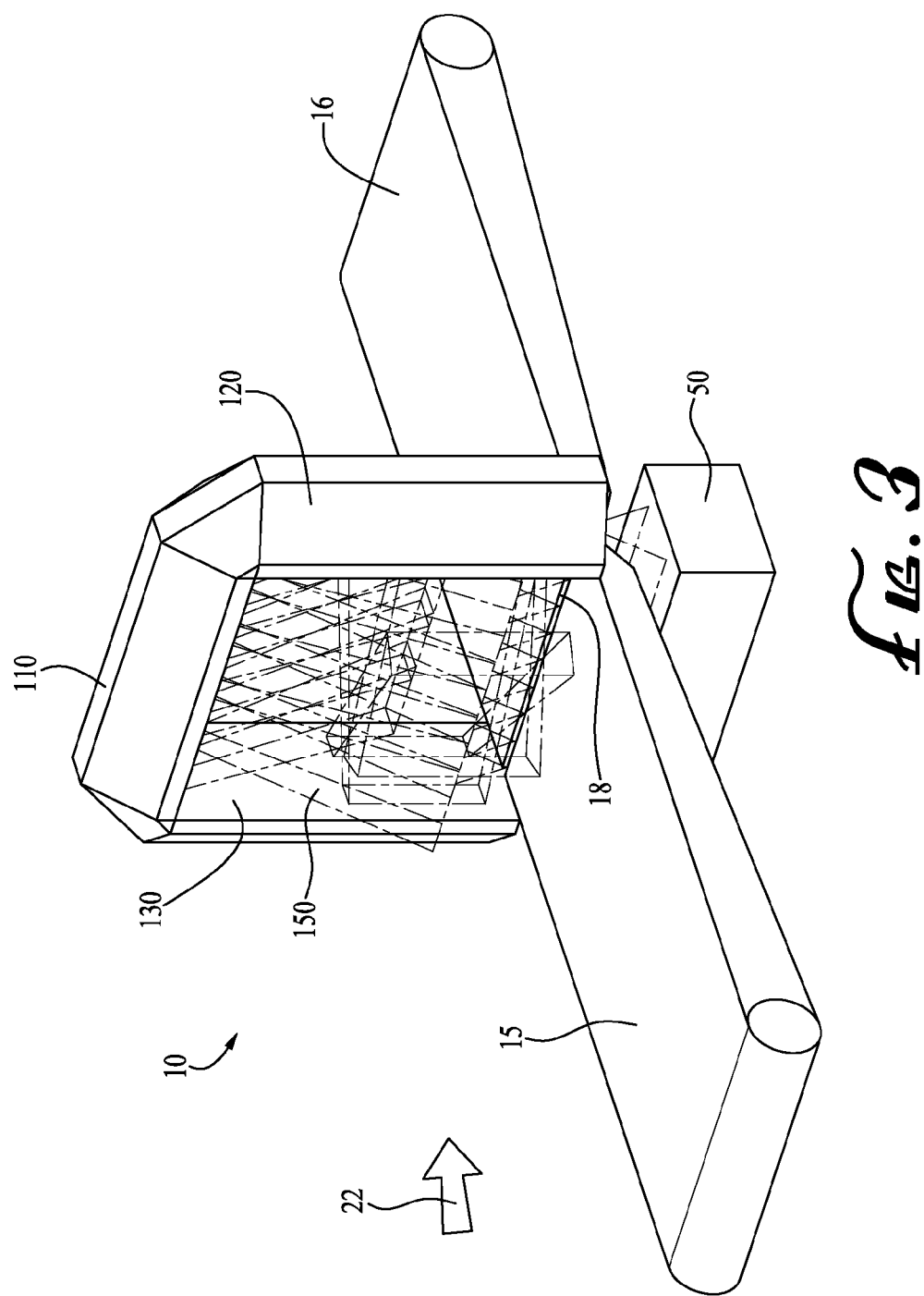
FIG. 3 is an isometric view of the automated checkout system of FIG. 2 illustrating a collective read region of a plurality of data readers.

In an example operation, a checkout clerk 38 or customer 40 (sometimes, separately or collectively referred to as a "user") places the item 20 onto the input conveyor 15, which transports the item 20 in a substantially linear direction of motion 22 toward the portal scanner 100. The item 20 moves through a read volume or read region 150 (see FIG. 3) of the portal scanner 100. With reference to FIG. 3, the read volume or region 150 may be defined by the collective views of the data readers 140, 145 of the portal scanner 100 and the bottom scanner 50. As the item 20 moves across the gap 18 and through the read region 150 of the portal scanner 100, the data readers 140, 145 (see FIG. 13) of the portal scanner 100 and the bottom scanner 50 capture an image of the item 20. The image is then processed to decode the barcode label (or other data) captured in the image. After passing through the portal scanner 100, the item 20 is transported on the exit conveyor 16 to a bagging area 17 where the user or other person can bag or box the item 20 for removal by the customer 40. Other embodiments and additional details of an example portal scanner, including a bottom scanner, are disclosed in U.S. App. Pub. No. 2013/0020392, filed Jan. 24, 2011, hereby incorporated by reference.

For general purposes of discussion, the item 20 is represented as a six-sided, box-shaped package. In some instances, the item 20 may be described with respect to its direction of motion 22 on the conveyors 15, 16. In addition, any description regarding the position of a checkout clerk 38 and a customer 40 is meant to facilitate description and establish a frame of reference related to a typical position of the checkout clerk 38 and the customer 40, as illustrated in FIG. 1, and is not intended to be limiting. For instance, the item 20 may be described as having a top side 26, a bottom side 28, and four lateral sides 30, 32, 34, and 36. The lateral sides may be referred to as the leading (or front lateral) side 30 (the side leading the object as it is passed through the read region), the trailing (or rear lateral) side 32 (the trailing side of the object as it is passed through the read region), the checker (or left lateral) side 34 (due to its proximity to a checkout clerk 38), and the customer (or right lateral) side 36 (due to its proximity to a customer 40).

It should be understood that the automated checkout stand 10 may be used without a checkout clerk 38, and/or the customer 40 (or clerk 38) may be positioned at any side of the automated checkout stand 10. In addition, the item 20 is described as a box-shaped package for convenience, but it should be understood that the item 20 may encompass other shapes, including, for example, round fruits or vegetables, cylindrical cans, irregularly shaped packages, such as a bag of potatoes, potato chips, or the like.

With reference to FIG. 2, the portal scanner 100 includes a generally inverted U-shaped arch having a top section 110 connected to left and right lateral leg sections 120, 130, respectively. The top section 110, and leg sections 120, 130 house a plurality of data readers 140, 145 each of which includes one or more cameras/imagers or other imaging systems and corresponding optics and other components (see FIG. 6 for example). As is discussed in further detail below, the data readers 140, 145 collectively form a read region 150 generally defined to include the inner space or enclosed area within the boundaries of the portal scanner 100 (see FIG. 3). In some embodiments, the read region 150 may extend outside (e.g., in front of and/or behind) the footprint of the portal scanner 100 depending on the angular orientation of the view volumes of the data readers 140, 145. Preferably, the left and right leg sections 120, 130 have identical configurations and are interchangeable to simplify manufacturing and assembly. Identical configurations also allow for the scanner sections 110, 120, 130 to be disassembled and stacked in a more compact package thus saving on shipping, staging, and storage costs.

As mentioned previously, when assembled, the left and right leg sections 120, 130 extend generally downwardly (or in some embodiments, orthogonally) from opposite ends of the top section 110 to create an inverted U-shaped arch. With reference to FIG. 1, the portal scanner 100 is preferably attached to a chassis or structure 132 which is mounted on the checkstand 5 between the front end section 11 and the rear end section 12. In such embodiments, the top section 110 extends across a width of the conveyors 15, 16 and the leg sections 120, 130 are mounted to the chassis 132 with a small clearance to avoid interfering with the conveyors 15, 16. Preferably, the portal scanner 100 is mounted on the chassis 132 such that the top section 110 is aligned with and overlaps the gap 18. In some embodiments, the top section 110 is centered over the gap 18 when the portal scanner 100 is installed on the checkstand 5.

As shown in FIGS. 1-2, the portal scanner 100 embodies a streamlined design with an open and airy architecture that is less bulky than a large enclosed tunnel structure. The minimal structure or configuration also provides sight lines for the customer 40 to see the items 20 passing through the read region 150. However, the portal scanner 100 nonetheless maintains sufficient structure to limit access to items 20 passing through the read region 150 (e.g., by the lateral leg sections 120, 130) to help avoid inaccurate readings and/or to enhance security of items 20 being processed.

In some embodiments, to further enhance security, a security camera 160 may be positioned within the top section 110 and/or within each of the leg sections 120, 130. For instance, in one embodiment (see FIG. 6), the security camera 160 may be positioned near the scan window 254 and the illumination modules 256 to avoid interfering with the view volume 225 of the data readers 140 (or data reader 145) of the top section 110. The security camera 160 preferably has a wide field of view to capture both the entry point of the item 20 (e.g. as the item 20 is transported on the entry conveyor 15 toward the portal scanner 100) and the exit point of the item 20 (e.g., as the item 20 is transported on the exit conveyor 16 toward the bagging area 17). In other embodiments, such as illustrated in FIG. 3, two individual security cameras 165 (rear camera not shown) may be used and positioned on an exterior surface of the top section 110, with one camera 165 facing the entry side (e.g., toward the input conveyor 15) and the other camera (not shown) facing the exit side (e.g., toward the exit conveyor 16). The security cameras may also be used to track and identify items 20 that pass through the portal scanner 100 without having their respective identifying information (e.g., barcode labels) read by the portal scanner 100 or bottom scanner 50. These items 20 may be referred to as exception items, which are items that need to be reprocessed through the portal scanner 100 to obtain the barcode labels or other information.

Internal read optics will now be described in more detail. As previously mentioned, internal read optics are disposed within (1) the leg sections 120, 130 of the portal scanner 100; (2) the top section 110 of the portal scanner 100; and (3) the bottom data reader 60 (see FIG. 13). Though the detailed example configuration of the portal scanner will be described as comprising of twelve cameras or imagers with each having multiple views, other reading system combinations may be employed including other imaging configurations with more or fewer cameras, laser reading systems, combinations thereof, or even including RFID readers.

Figure 13:
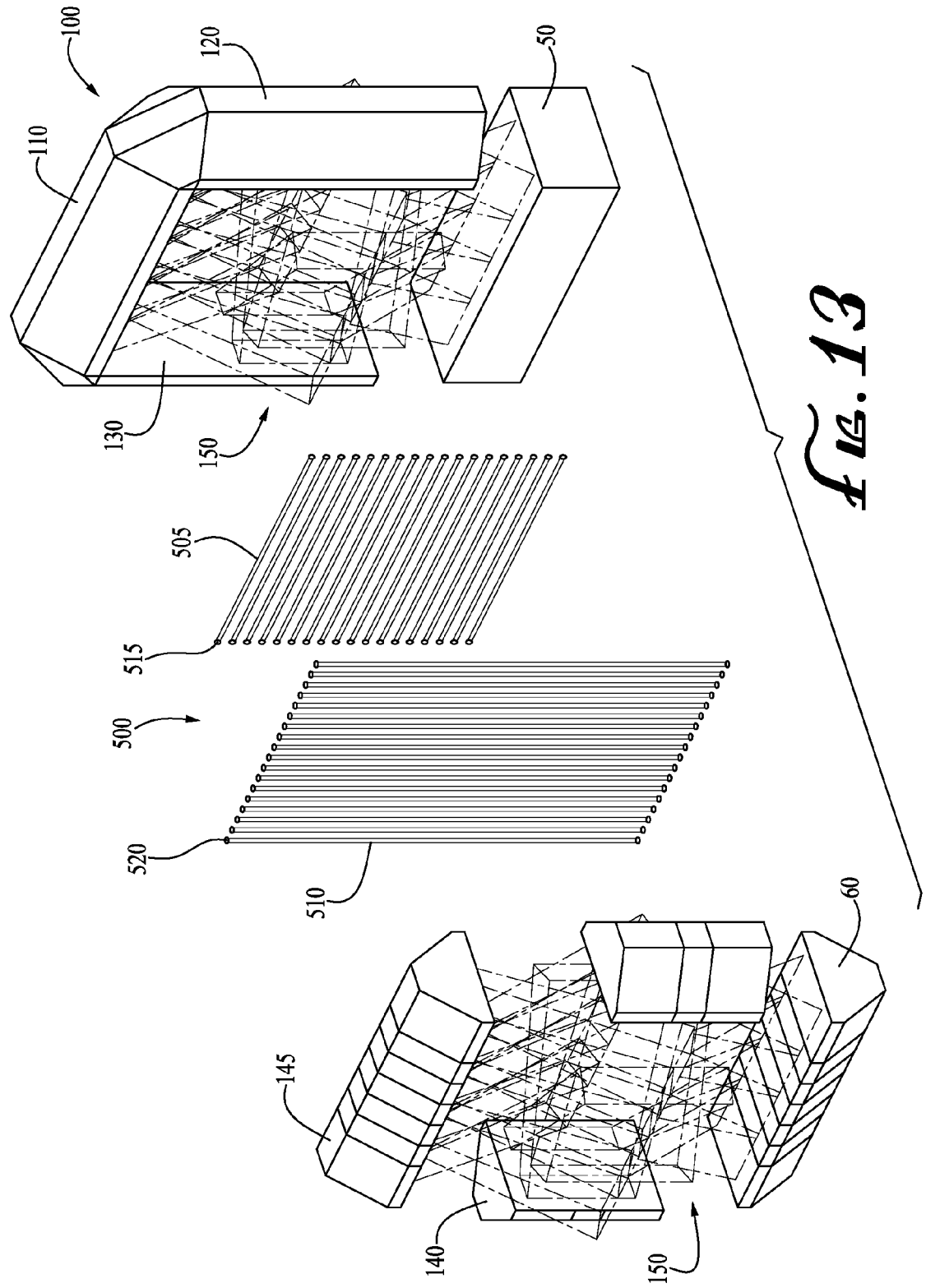
FIG. 13 is a partially exploded view of the scanner and bottom reader of FIG. 3, illustrating an example arrangement of the plurality of data readers.

FIG. 3 illustrates a simplified perspective view of the automated checkout system 10 illustrating view volumes of a plurality of data readers 140, 145, 60 (see FIG. 13). As further described in detail below, the data readers 140, 145 are housed within the leg sections 120, 130 and the top section 110, respectively, of the portal scanner 100 (see FIG. 13). The automated checkout system 10 also includes a bottom scanner 50 separate from the portal scanner 100 that may be housed within the chassis 132, the bottom scanner 50 housing a plurality of data readers 60 therein (see FIG. 13). The data readers 140, 145, 60 each include one or more cameras or imaging system, each camera directing an individual view volume generally within the outer confines or footprint of the portal scanner 100. Collectively, the view volumes overlap or cross one another and define a read region 150 of the automated checkout system 10. When the item 20 travels through the read region 150, one or more of the data readers 140, 145, 60 capture the optical code label (or other target data) from the item 20 for processing.

For purposes of description, the read region 150 and the view volumes (e.g., 225, 230 described below) illustrated in dashed lines in the figures are a 3D volume of space in which there is a high probability of a successful read of an optical code placed within that volume of space. It should be noted that the read region 150 and the view volumes shown in the figures are not an exact representation but merely an illustration of the volumetric region in which the portal scanner 100 may be capable of reading optical codes placed therein. Other factors may affect the volumetric region for a successful read, such as the depth of field of the readers.

In some embodiments, the read region 150 may be substantially confined within the enclosed area of the portal scanner 100. In other embodiments, the read region 150 may extend outside or beyond the footprint of the portal scanner 100. For example, the data readers 145 in the top arch section 110 may have view volumes that partially extend beyond the portal scanner 100 to obtain an image of the item 20 prior to it entering the physical boundary of the portal scanner 100, or after it leaves the portal scanner 100 on the exit conveyor 16. Further details relating to the view volumes of the data readers 140, 145, 60 are described below.

The reading function from the leg sections 120, 130 will be described first with respect to FIGS. 4-6. In the following description, the reading function will be described with respect to leg section 130 for convenience with the understanding that leg section 120 may include identical or substantially similar components arranged in an identical or substantially similar configuration. Preferably, the leg sections 120, 130 have identical camera and optics configurations for each of the data readers, but it should be understood that adjustments may be made to one or both leg sections 120, 130 to alter the reading functions as desired.

Figure 14:
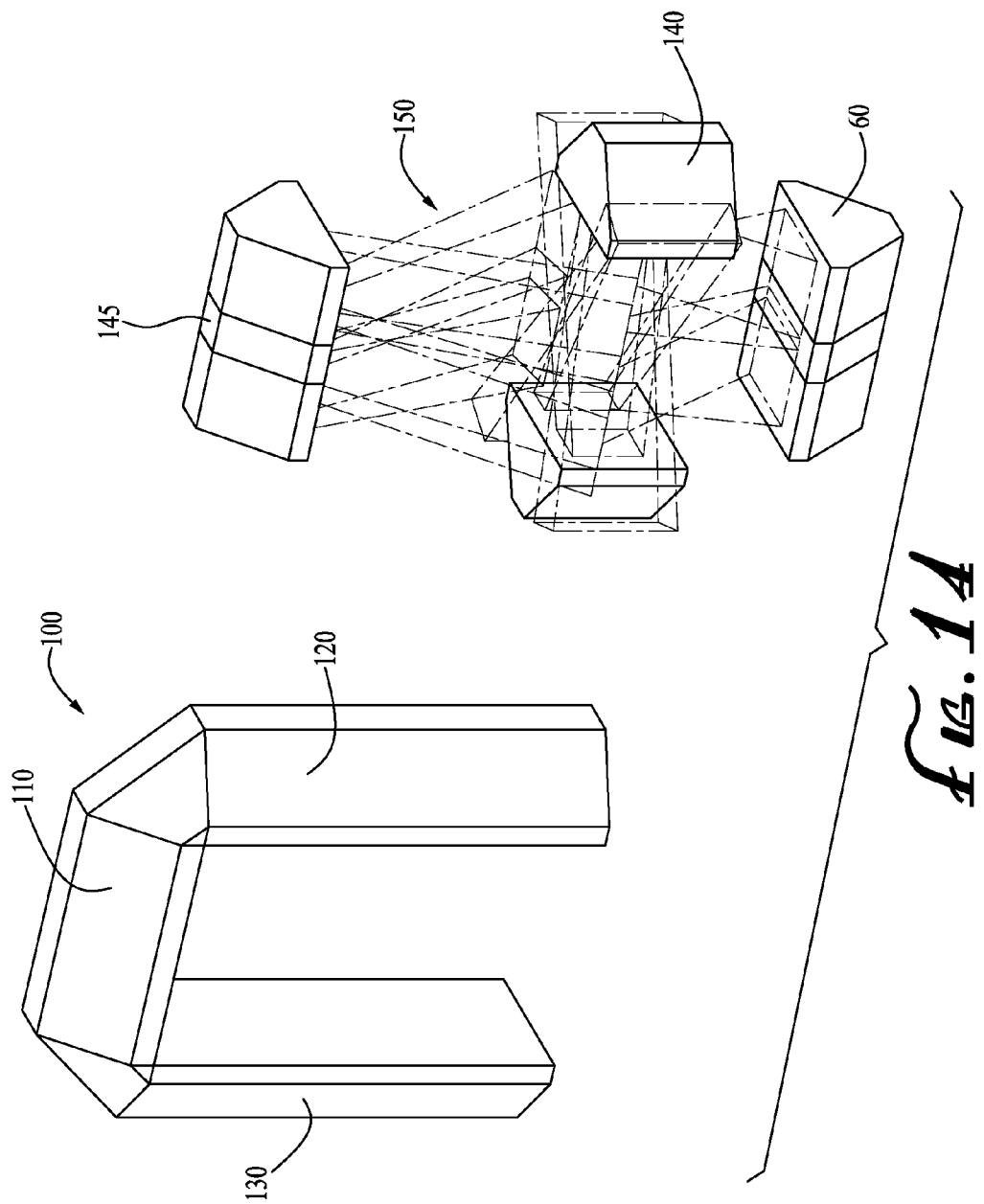
FIG. 14 is a partially exploded view illustrating a data reader configuration of the portal scanner of FIG. 1.

In the following description, the specific details of the data readers 140, 145, 60, including optics arrangements and image views generated therefrom, are described for the leg sections 120, 130, the top section 110, and the bottom data reader 60. Although the optics and image views are described for a single data reader positioned in each of these sections, it should be understood that each of the leg sections, 120, 130, the top section 110, and the bottom scanner 50 may include multiple data readers that collectively generate a number of individual views as further discussed with respect to FIG. 14.

Figure 4:
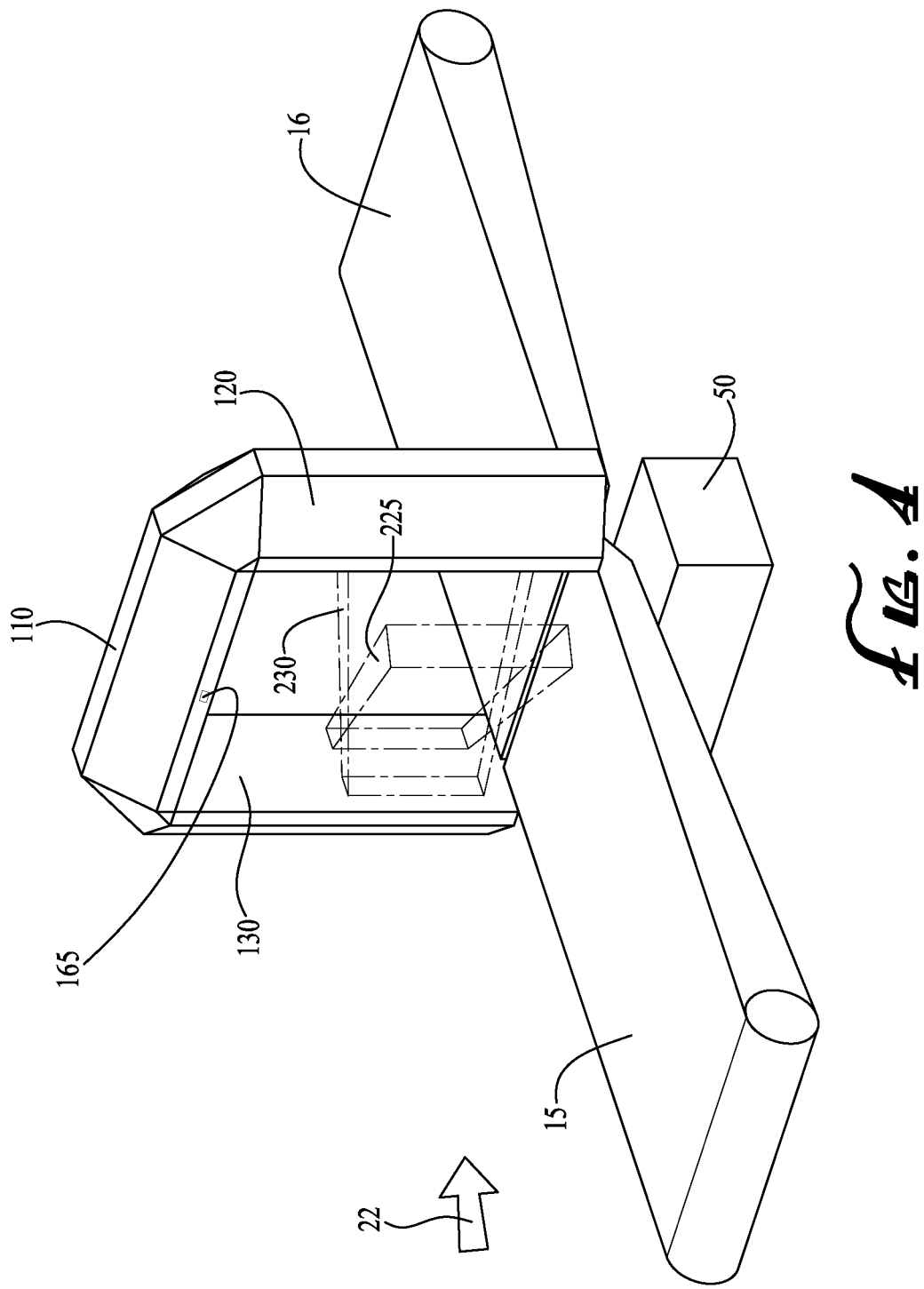
FIG. 4 is an isometric view of the automated checkout system of FIG. 2 illustrating a view volume of data readers in a leg section of the portal scanner.
Figure 5:
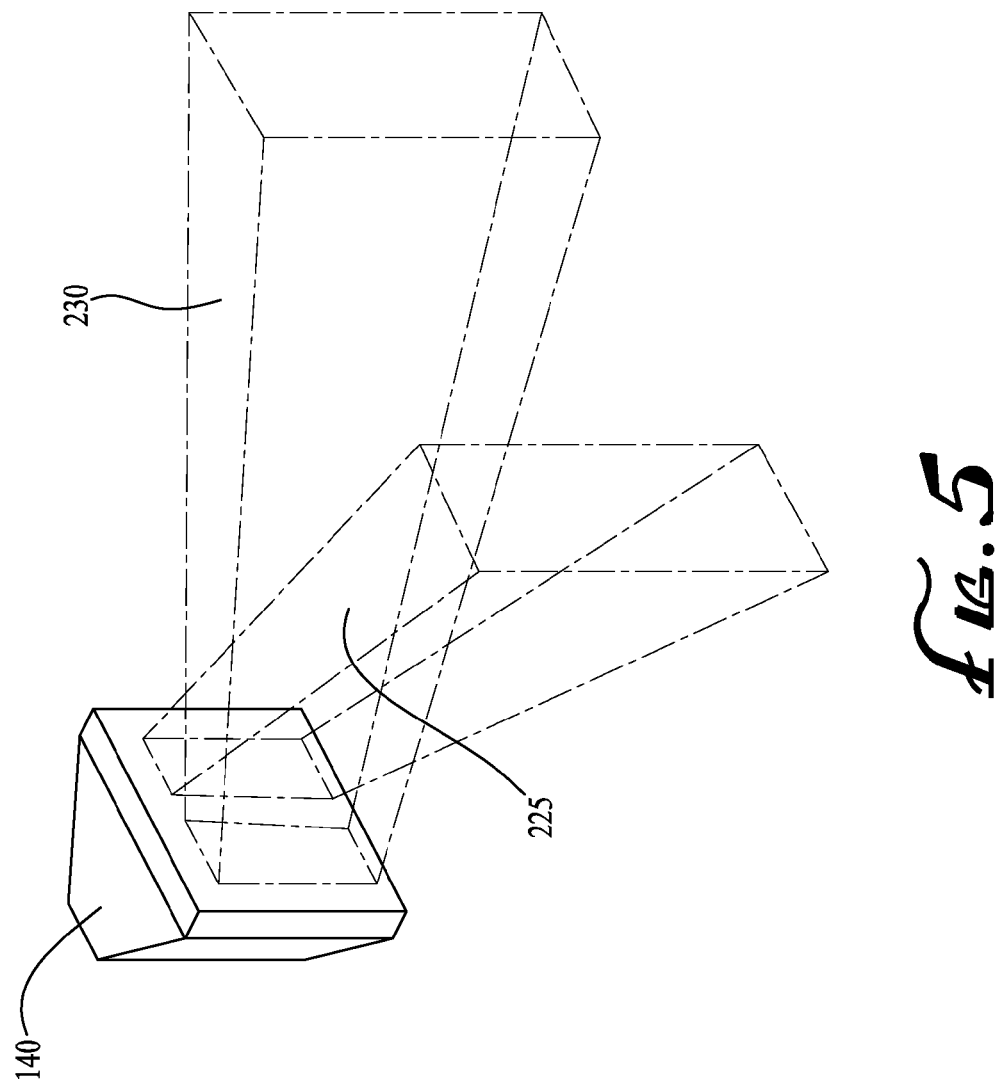
FIG. 5 is a diagrammatic view illustrating a view volume of one of the plurality of data readers of the automated checkout stand of FIG. 4.

FIGS. 4-5 illustrates view volumes 225, 230 of the data readers 140 housed in the leg section 130. FIG. 6 illustrates further details of the data reader 140 and an optics set 220, including an imager (or camera) 232. The optics set 220 is disposed within the leg section 130 of the portal scanner 100 as described previously. With particular reference to FIGS. 4-5, the optics set 220 produces a pair of view volumes 225, 230 facing sidewardly (e.g., transversely across the conveyors 15, 16) from the leg section 130 in a crisscrossing configuration so that the view volumes 225, 230 intersect or cross one another. The point of intersection between the view volumes 225, 230 may depend on various factors, such as the spacing or separation between the respective cameras and the angle of the view volume, for example. The view volumes 225, 230, together with the view volumes from the opposite leg section 120, span across the conveyor sections 15, 16 to collectively capture a view of the checker and customer sides 34, 36 of the item 20 (and in some cases the leading and trailing views 30, 32).

In some embodiments, the first view volume 225 is aimed rearwardly relative to the direction of motion 22 of the item 20 (i.e., aimed toward the front end section 11 of the checkstand 5) for obtaining images of the leading side 30, and the checker side 34 (and in some instances the top side 26) of the item 20 as it passes through the portal scanner 100 traveling in the direction of motion 22 (see FIG. 1). The second view volume 230 is aimed forwardly relative to the direction of motion 22 (i.e., aimed toward the rear end section 12 of the checkstand 5) for obtaining images of the checker side 34, the trailing side 32 (and in some instance the top side 26). As briefly mentioned above, the other leg section 120 includes a similar arrangement of data readers with view volumes to capture the customer side 36, the leading side 30, and the trailing side 32 (and in some instances, the top side 26).

Figure 6:
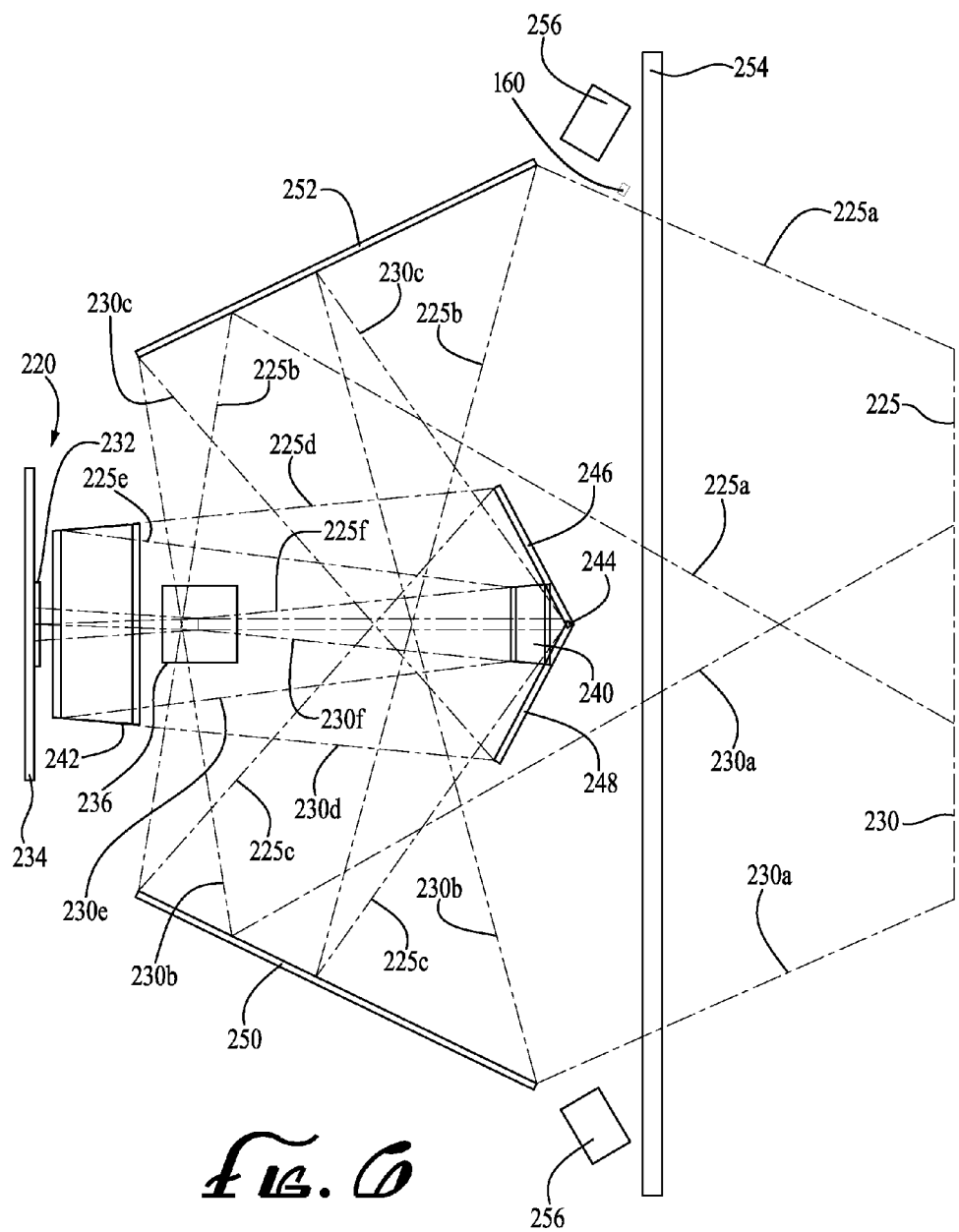
FIG. 6 is a diagrammatic top view of an example arrangement for optical components of the data readers of FIG. 4 for forming the view volume.

With particular reference to FIG. 6, details of the optic set 220 and view volumes 225, 230 for the leg section 130 will now be described. FIG. 6 illustrates both the first and second view volumes 225, 230 produced from the optics set 220. Optic set 220 includes the camera along with the mirror sets. The camera comprises an imager 232 mounted on an image board (PCB) 234 and the focusing lens 236 for focusing the incoming image from the view volumes 225, 230 onto the imager 232. Preferably, the images from each of the view volumes 225, 230 are focused onto a common imager 232. For instance, images from the first view volume 225 are focused on one region of the imager 232 and images from the second view volume 230 are focused on a different region of the imager 232.

FIG. 6 is a diagrammatic top view of the optics set and mirror configuration for reflecting view volumes 225, 230 along respective image paths to the imager 232. When an item 20 travels on the automated checkout system 10, an image of the item 20 is captured as the item 20 passes through the view volumes 225, 230. The captured image is propagated by the mirrors 252, 250, 244, 242, 240 and ultimately focused on the imager 232 as further described in detail below. The view volumes 225, 230 may be illuminated by one or more illumination sources 256 (e.g., LED arrays) positioned near the scan window 254 to improve image capture capabilities.

With respect to the first view volume 225, the image of the item 20 is captured in the view volume 225 and is propagated through a scan window 254 along a first image path segment 225a. First image path segment 225a is reflected sidewardly by a first mirror 252 along a second image path segment 225b to a second mirror 250, which reflects the image forwardly (i.e., toward the scan window 254) along a third image path segment 225c toward a first mirror portion 246 of a third or split mirror 244. The first mirror portion 246 reflects a fourth image path segment 225d rearwardly (i.e., toward the imager 232) to a fourth mirror 242, which reflects a fifth image path segment 225e forwardly to a fifth mirror 240, which reflects the image along a sixth image path segment 225f to the imager 232 supported on the PCB 234. The image may be focused by a suitable focusing lens 236 positioned in front of the imager 232.

Similarly, with respect to the second view volume 230, an image of the item 20 is captured in the view volume 230 and is propagated through the scan window 254 along a first image path segment 230a. First image path segment 230a is reflected sidewardly by the second mirror 250 along a second image path segment 230b to the first mirror 252, which reflects the image forwardly along a third image path segment 230c toward a second mirror portion 248 of the split mirror 244. The second mirror portion 248 reflects a fourth image path segment 230d rearwardly to the fourth mirror 242, which reflects a fifth image path segment 230e forwardly to the fifth mirror 240, which reflects the image along a sixth image path segment 230f to the imager 232 supported on the PCB 234. The image may be focused by a suitable focusing lens 236 positioned in front of the imager 232.

Figure 7:
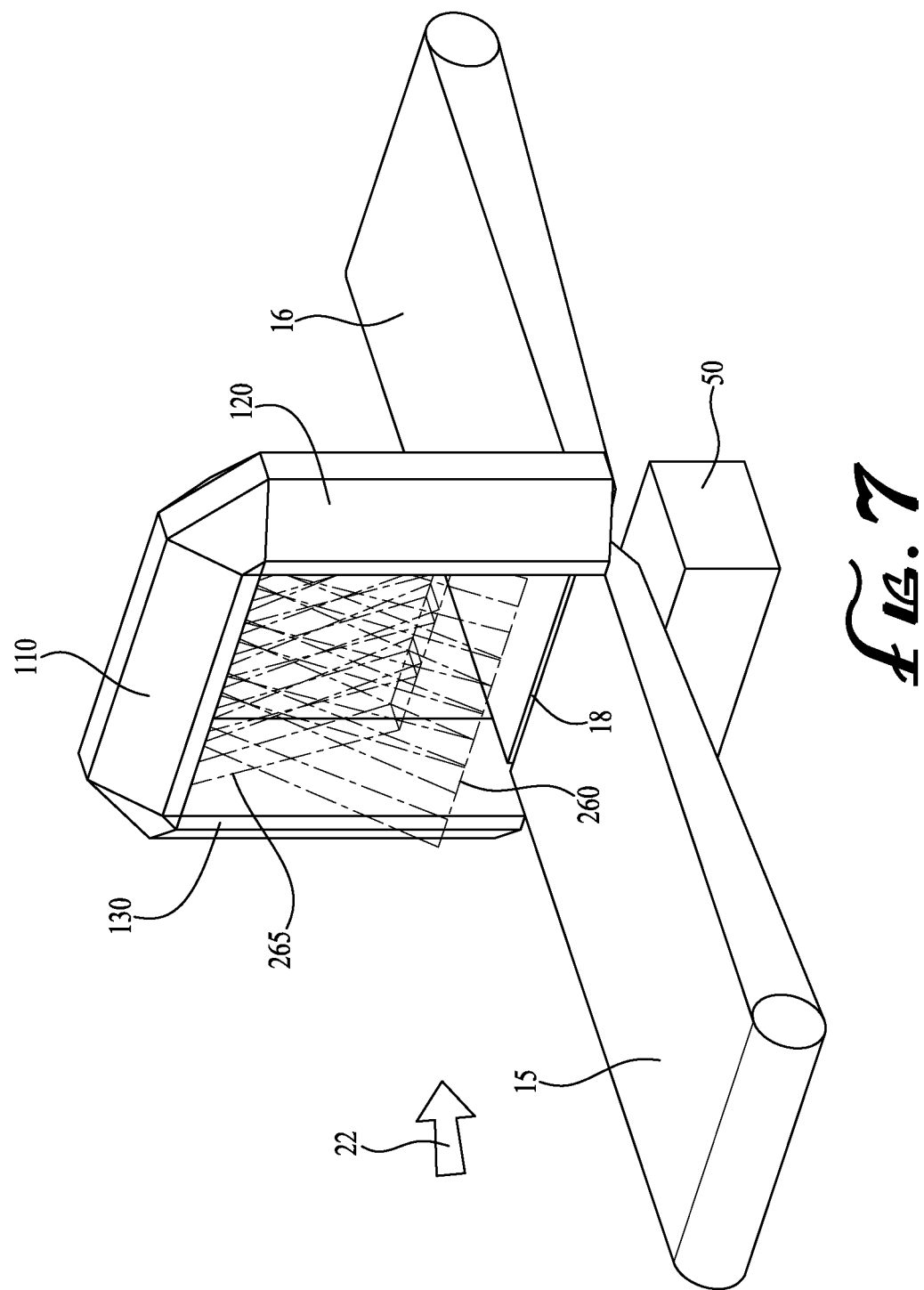
FIG. 7 is an isometric view of the automated checkout system of FIG. 3 illustrating a view volume of data readers in a top section of the portal scanner.

FIG. 7 illustrates a view volume of the data readers 145 housed in the top section 110 of the portal scanner 100. Preferably, the data readers 145 have an identical or substantially similar optics arrangement as described with respect to the data readers 140 of FIGS. 4-6. To avoid repetition, the description regarding the optics set of the data readers 145 will not be further described in detail. As with the optics set 220, the optics set for the data readers 145 includes an imager and a lens. With particular reference to FIG. 7, the optics set for the data readers 145 produces a pair of view volumes 260, 265 facing downwardly from the top section 110 in a similar crisscrossing configuration as the view volumes 230, 235 described in FIG. 6 so that the view volumes 260, 265 intersect or cross one another. As described previously with respect to FIG. 4, the point of intersection between the view volumes 260, 265 may depend on various factors, such as the spacing or separation between the respective cameras and the angle of the view volume, for example.

The data reader 145 in the top section 110 has a rear view volume 260 (i.e., facing toward the input conveyor 15) and a forward volume 265 (facing toward the exit conveyor 16) directed generally downward from the top section 110 toward the conveyors 15, 16. The rear view volume 260 is aimed downwardly and slanted rearwardly from the top section 110 and upstream of the gap 18 (i.e., aimed toward the front end section 11 of the checkstand 5) for obtaining images of the top side 26 and the leading side 30 of the item 20 as it enters and passes through the portal scanner 100 traveling in the direction of motion 22 (see FIG. 1). The forward view volume 265 is aimed downwardly and slanted forwardly from the top section 110 and downstream of the gap 18 (i.e., aimed toward the rear end section 12 of the checkstand 5) for obtaining images of the top side 26 and the trailing side 32 of the item 20 as it passes through and exits the portal scanner 100.

Preferably, to avoid any blind spots in the collective read region 150 of the data readers 145, 150, the view volumes 225, 230, 260, 265 are arranged to overlap with each other, thereby collectively capturing a complete view of all sides 30, 32, 34, 36 and the top 26 of the item 20. In addition, the view volumes 225, 230, 260, 265 allow the portal scanner 100 to obtain images or capture other data from the items 20 when the items 20 are outside (i.e., either in front or behind) the arch structure of the portal scanner 100.

Figure 8:
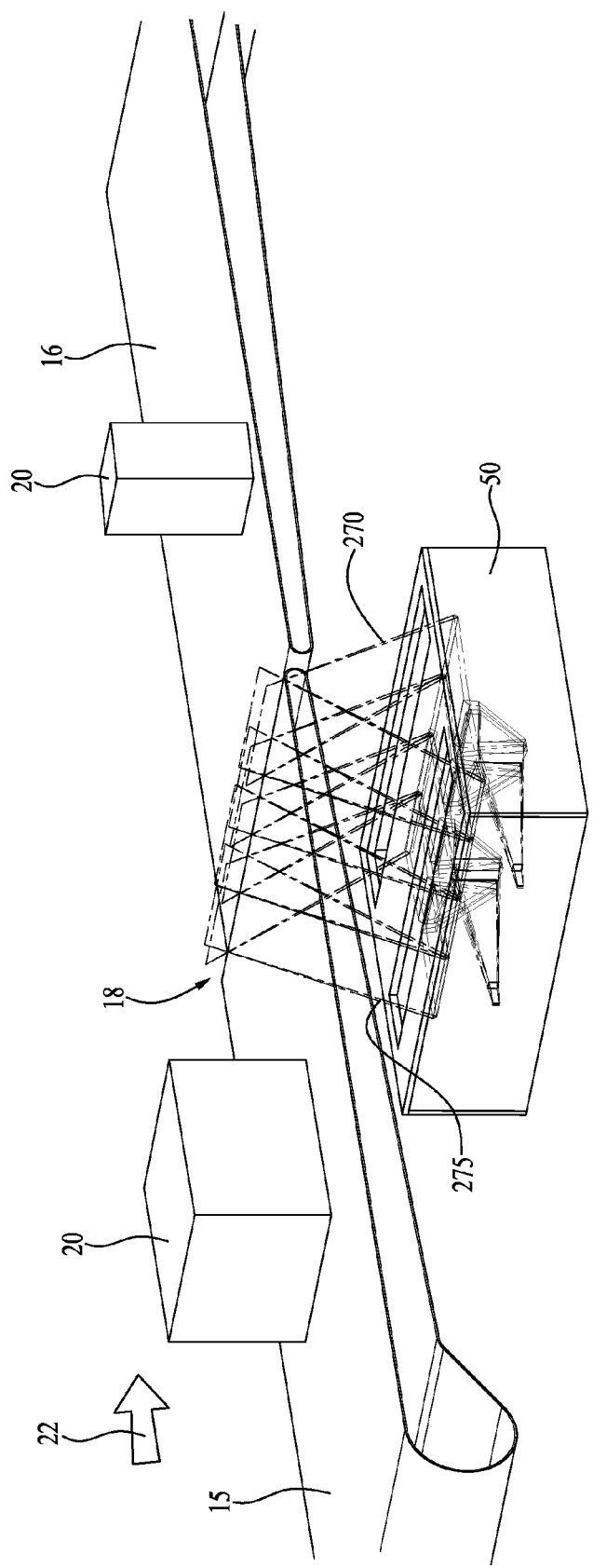
FIG. 8 is a diagrammatic view illustrating a view volume of the bottom data reader of FIG. 3 with the portal scanner removed.

FIG. 8 illustrates a read region of the bottom scanner 50. In one embodiment, the bottom data readers 60 housed within the bottom scanner 50 each has an identical or substantially similar optical arrangement as the data readers 145, 150 on the leg and top sections 110, 120, 130 of the portal scanner 100. With reference to FIG. 8, the bottom data readers 60 include an optics set that produces view volumes 270, 275 facing upwardly through the gap 18 in a similar crisscrossing configuration as the view volumes 225, 230, 260, 265 previously described for the data readers 140, 145. The view volumes 270, 275 are directed through the gap 18 for reading a bottom side 28 of the item 20 as the item 20 transitions between the conveyors 15, 16.

In some embodiments, the rear view volume 270 is aimed upwardly and slanted rearwardly from the bottom scanner 50 and upstream of the gap 18 (i.e., aimed toward the input conveyor 15) for obtaining views of the bottom side 28 and sometimes the leading side 30 of the item 20 as it enters the portal scanner 100 and crosses the gap 18 traveling in the direction of motion 22 (see FIG. 1). The forward view volume 275 is aimed upwardly and slanted forwardly from the bottom scanner 50 and downstream of the gap 18 (i.e., aimed toward the exit conveyor 16) for obtaining images of the bottom side 28 and the trailing side 32 of the item 20 as it crosses the gap 18 and exits the portal scanner 100. Preferably, to avoid any blind spots in the read region 150, the view volumes 270, 275 are arranged to overlap with the view volumes 225, 230, 260, 265 of the data readers 140, 145 so that the data readers 140, 145, 60 may collectively capture an image from all sides 30, 32, 34, 36, the top side 26, and the bottom side 28 of the item 20.

Figure 9:
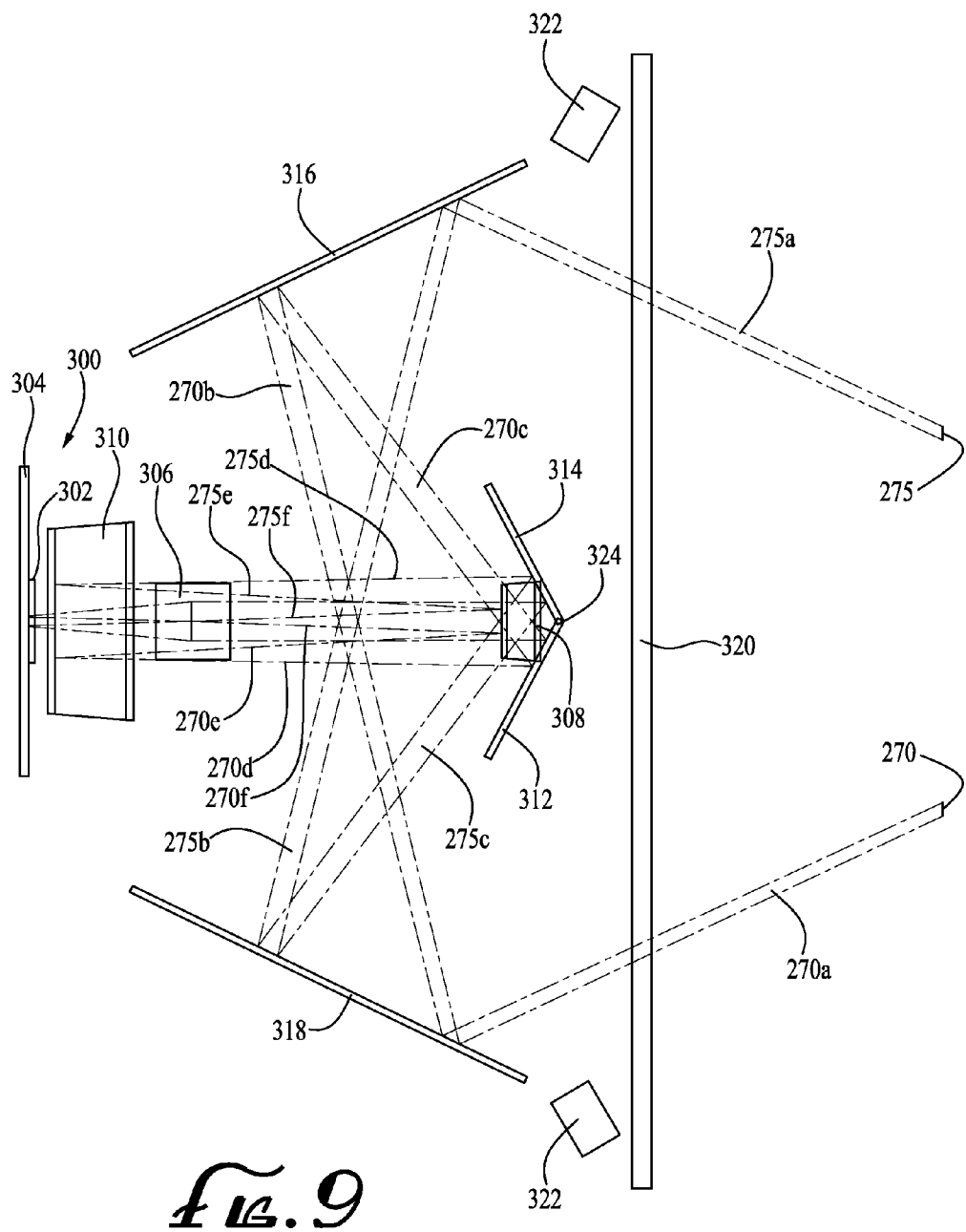
FIG. 9 is a diagrammatic top view of an example arrangement for optical components of the bottom data reader of FIG. 8.

In some embodiments, the bottom data reader 60 may be a linear imager and the view volumes 270, 275 may be single line/planar views directed up through the gap 18. With particular reference to FIG. 9, the bottom data reader 60 in this arrangement may have a similar optics arrangement as the data reader 140. In particular, an optic set 300 includes the camera along with the mirror sets as illustrated in FIG. 9. The camera comprises an imager 302 mounted on an image board (PCB) 304 and a focusing lens 306 for focusing the incoming image onto the imager 302. The view volumes 270, 275 may be illuminated by one or more illumination sources 322 (e.g., LED arrays) positioned near the scan window 320 to improve data reading capabilities.

With respect to the first view volume 270, the image of the item 20 is captured in the view volume 270 and is propagated through a scan window 320 along a first image path segment 270a. First image path segment 270a is reflected sidewardly by a first mirror 318 along a second image path segment 270b to a second mirror 316, which reflects the image forwardly (i.e., toward the scan window 320) along a third image path segment 270c toward a first mirror portion 312 of a third or split mirror 324. The first mirror portion 312 reflects a fourth image path segment 270d rearwardly (i.e., toward the imager 302) to a fourth mirror 310, which reflects a fifth image path segment 270e forwardly to a fifth mirror 308, which reflects the image along a sixth image path segment 270f to the imager 302 supported on the PCB 304. The image may be focused by a suitable focusing lens 306 positioned in front of the imager 302.

Similarly, with respect to the second view volume 275, an image of the item 20 is captured in the view volume 275 and is propagated through the scan window 320 along a first image path segment 275a. First image path segment 275a is reflected by the second mirror 316 along a second image path segment 275b to the first mirror 318, which reflects the image forwardly along a third image path segment 275c toward a second mirror portion 314 of the split mirror 324. The second mirror portion 314 reflects a fourth image path segment 275d rearwardly to the fourth mirror 310, which reflects a fifth image path segment 275e forwardly to the fifth mirror 308, which reflects the image along a sixth image path segment 275f to the imager 302 supported on the PCB 304. The image may be focused by a suitable focusing lens 310 positioned in front of the imager 302.

Figure 10:
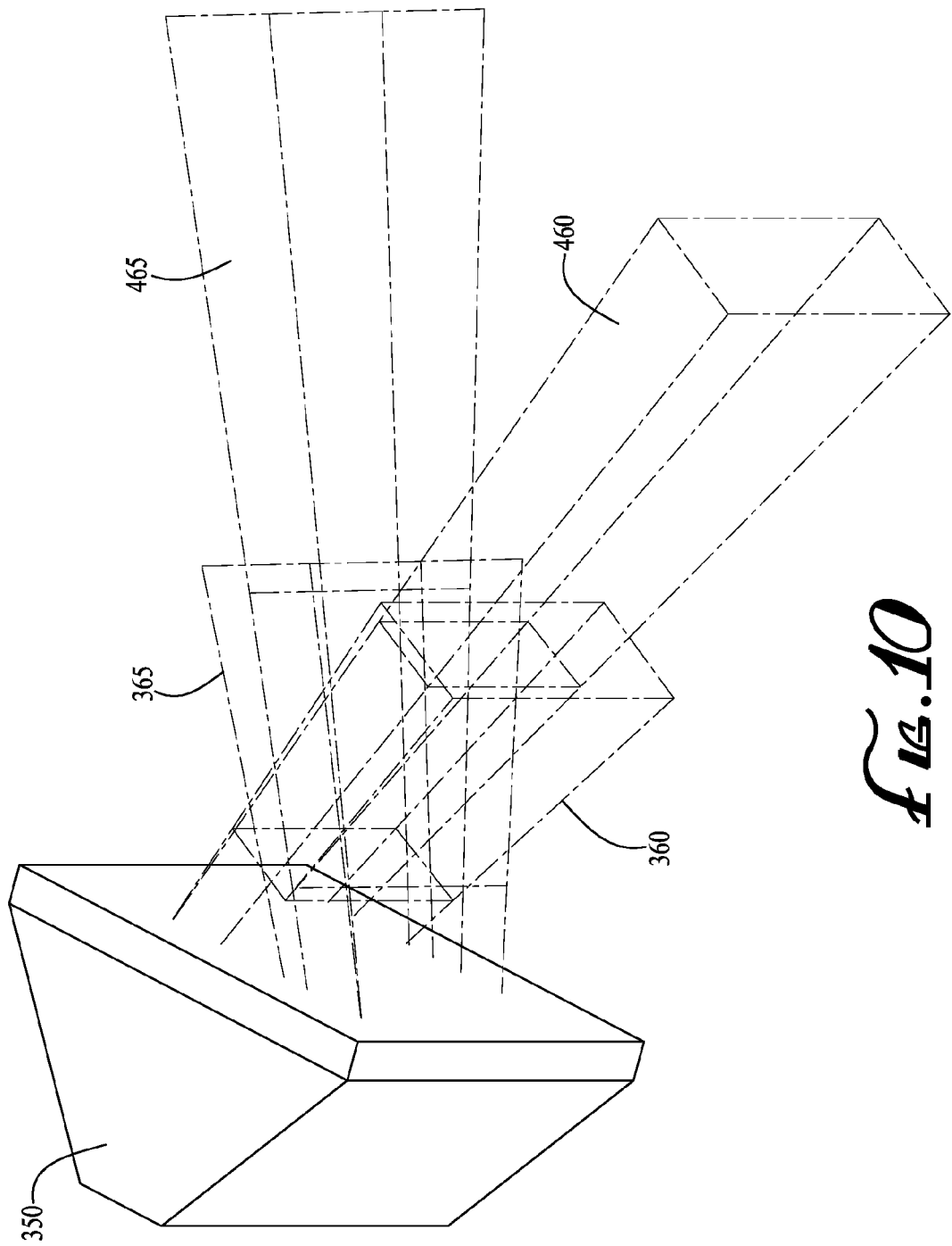
FIG. 10 is a diagrammatic side view of the view volume for one of the data readers of FIG. 3, according to another embodiment, where the data reader uses a dual-camera configuration.
Figure 11:
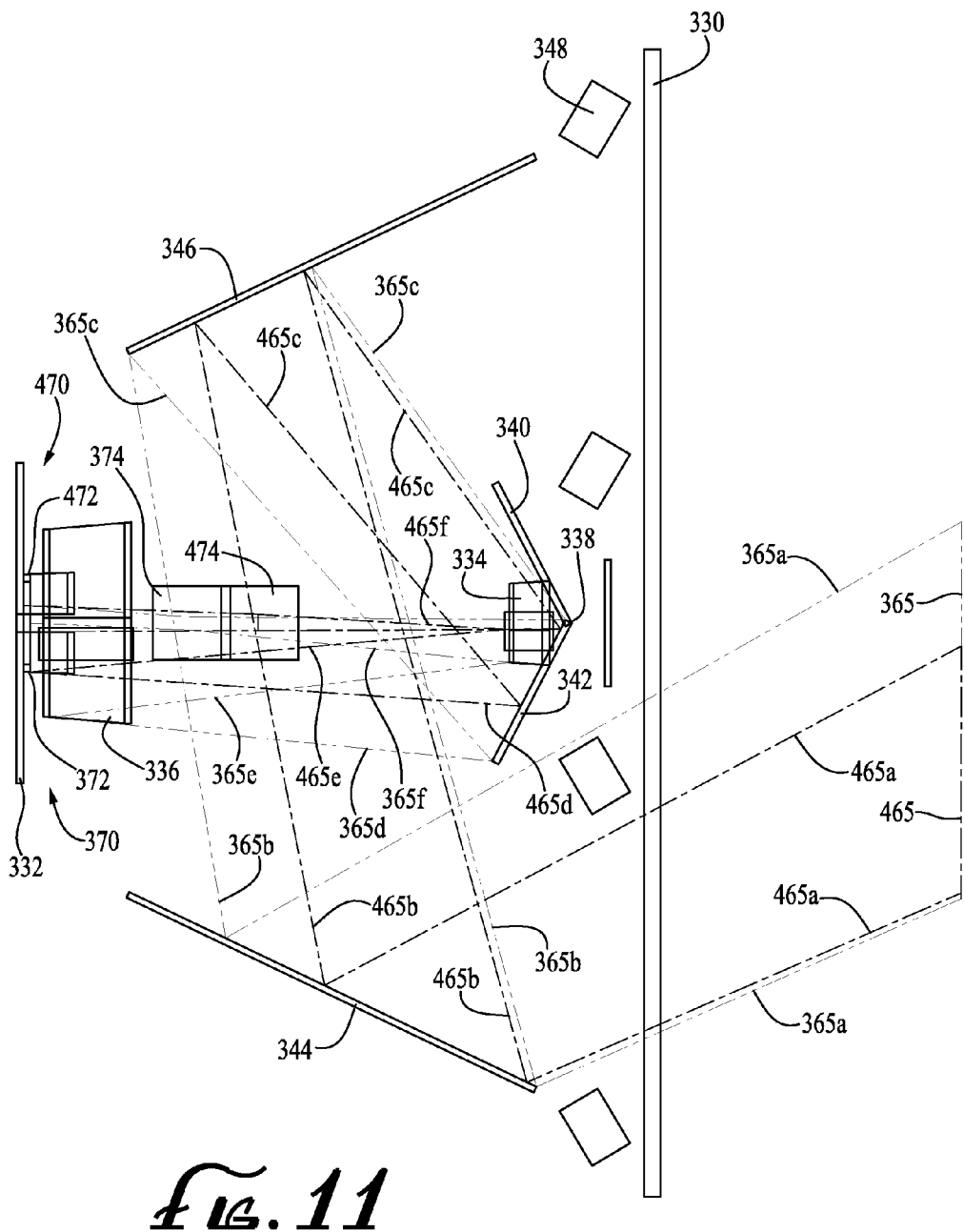
FIGS. 11 and 12 are diagrammatic top views of an example arrangement of optical components of the dual-camera data reader of FIG. 10.
Figure 12:
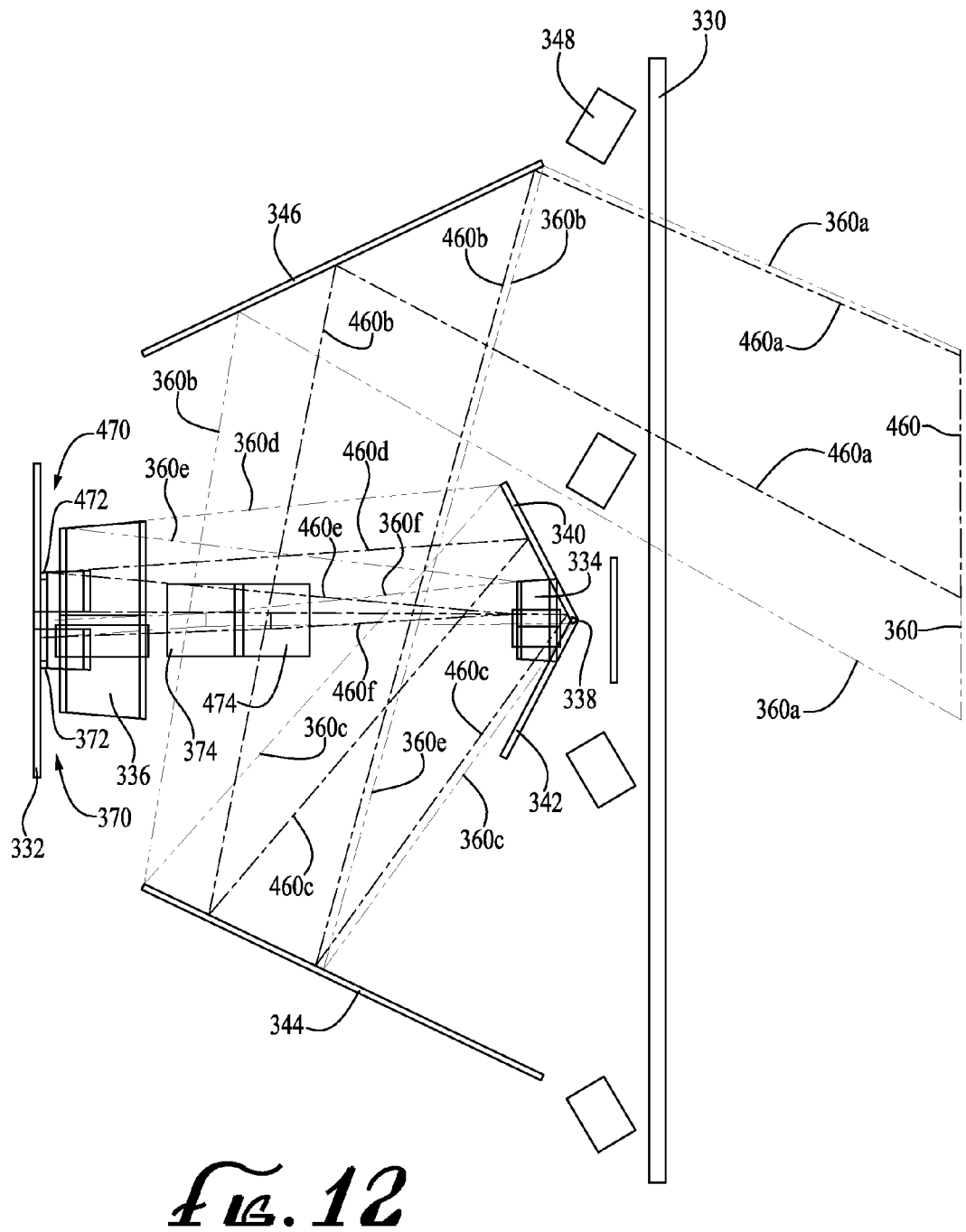

FIGS. 10-12 illustrate another embodiment of an optics arrangement for the data readers 350 of the portal scanner 100, where the data readers 350 incorporate a dual-camera configuration. One of the cameras has a wide field-of-view (i.e., short focal length) with a pair of crisscrossing, near-field view volumes 360, 365, while the other of the cameras has a narrow field-of-view (i.e., long focal length) with a pair of crisscrossing far-field view volumes 460, 465. For instance, in one embodiment, the wide field-of-view camera may use a 25 mm lens and the narrow field-of-view camera may use a 35 mm lens.

The view volumes 360, 365, 460, 465, are arranged in a similar configuration as described in previous embodiments to read the sides 30, 32, 34, 36 and the top 26 of the item 20 (e.g., the view volumes are aimed downwardly from the top section 110 or transversely from the leg sections 120, 130 depending on whether the cameras are on the top section 110 or leg sections 120, 130 of the portal scanner 100). In some embodiments, the bottom scanner 50 may or may not have a dual-camera configuration.

This dual camera configuration of the data reader 350 may be used in the top section 110 and/or the leg sections 120, 130 of the portal scanner 100 (e.g., in place of the data readers 140, 145). This configuration provides one camera with a long depth of field to optimize the reading of large, low density optical code (e.g., barcode) labels or labels at longer distances from the camera, and the other camera with a shorter depth of field to optimize the reading of smaller, higher density labels or labels at shorter distances from the camera.

As is further described in detail below, the two cameras may share a common set of mirrors and may have optical paths propagated by the mirrors in a collinear configuration relative to one another (e.g., the optical path of the near-field camera may be slightly offset above or below the optical path of the far-field camera). Accordingly, in the following description, similar components and features are described concurrently to avoid repetition and confusion. When describing identical components between the two cameras, the description uses reference numerals in the 300-series to refer to the components of the near-field camera and uses reference numerals in the 400-series (in parenthesis) to refer to the components of the far-field camera.

The details of the optics set 370, 470 and view volumes 360, 365, 460, 465 will now be described. In some embodiments, the optics and mirror configurations for the dual-camera configuration may be substantially similar to the optics and mirror configuration described with respect to the previous embodiments. The optics set 370 (or 470) comprises an imager 372 (or 472) mounted on a shared image board (PCB) 332 and a focusing lens 374 (or 474) for focusing the incoming image onto the imager 372 (or 472). Since the view volumes 360, 365 of the near-field camera and the view volumes 460, 465 of the far-field camera may be collinear and exit the scan window 330 in the same general region, the view volumes may be illuminated by a common illumination source 348 (e.g., LED arrays) positioned near the scan window 330 to improve image capture capabilities.

For ease of illustration, the collective view volumes for the dual-camera configuration were separated into two halves in FIGS. 11 and 12. With particular reference to FIG. 11, an image of the item 20 captured in the view volume 365 (or 465) is propagated through a scan window 330 along a first image path segment 365a (or 465a). First image path segment 365a (or 465a) is reflected sidewardly by a first mirror 344 along a second image path segment 365b (or 465b) to a second mirror 346, which reflects the image forwardly (i.e., toward the scan window 330) along a third image path segment 365c (or 465c) toward a first mirror portion 342 of a third or split mirror 338. The first mirror portion 342 reflects a fourth image path segment 365d (or 465d) rearwardly (i.e., toward the PCB 332) to a fourth mirror 336, which reflects a fifth image path segment 365e (or 465e) forwardly to a fifth mirror 334, which reflects the image along a sixth image path segment 365f (or 465f) to the imager 372 (or 472) supported on the PCB 332. The image may be focused by a suitable focusing lens 374 (or 474) positioned in front of the imager 372 (or 472).

Similarly, with particular reference to FIG. 12, an image of the item 20 captured in the view volume 360 (or 460) is propagated through the scan window 330 along a first image path segment 360a (or 460a). First image path segment 360a (or 460a) is reflected sidewardly by the second mirror 346 along a second image path segment 360b (or 460b) to the first mirror 344, which reflects the image forwardly (i.e., toward the scan window 330) along a third image path segment 360c (or 460c) toward a second mirror portion 340 of the split mirror 338. The second mirror portion 340 reflects a fourth image path segment 360d (or 460d) rearwardly (i.e., toward the PCB 332) to the fourth mirror 336, which reflects a fifth image path segment 360e (or 460e) forwardly to the fifth mirror 334, which reflects the image along a sixth image path segment 360f (or 460f) to the imager 372 (or 472) supported on the PCB 332. The image may be focused by a suitable focusing lens 374 (or 474) positioned in front of the imager 372 (or 472).

FIG. 13 is a partially exploded view of the portal scanner 100 and bottom scanner 50 of FIG. 3 illustrating an object measurement system 500 that uses dead reckoning to track a position of items 20 as they pass through the read region 150. The object measurement system 500 includes a height light curtain 505 (for determining a height and length of the item 20 passing therethrough) and a lateral light curtain 510 (for determining the lateral position and width of the item 20 on the conveyor 14). In some embodiments, the height light curtain 505 is formed by sensor elements 515 positioned vertically on each of the leg sections 120, 130, preferably in an aligned configuration (e.g., with pairs of sensors facing one another from the leg sections 120, 130). Similarly, lateral light curtain 510 is formed by sensor elements 520 positioned horizontally across the top section 110 and the bottom scanner 50. The portal scanner 100 may be positioned on the checkstand 5 so that the top section 110 is centered above the gap 18 and the sensor elements 520 on the top section 110 are aligned with corresponding sensor elements 520 on the bottom scanner 50 to form the lateral light curtain 510 without interruption by the conveyors 15, 16.

When an item passes through the light curtains 505, 510 certain ones of the sensor elements 515, 520 are blocked depending on the height of the item 20, the length of the item 20, the lateral position of the item 20, and the width of the item 20 on the conveyor 15. Multiple reads of the light curtains 505, 510 provide light curtain data corresponding to a vertical object sensor (VOS) profile that represents the height and longitudinal length of the item 20 and a lateral object sensor (LOS) profile that represents the width and lateral position on the conveyor 14 of the item 20. The VOS and LOS profiles may be combined by the object measurement system to produce model data representing a three-dimensional model of the item.

When an item 20 is scanned and decoded, the model data (produced as described above) is combined with the timing and trajectory of the detected barcode to correlate barcode data with the three-dimensional model of the item at an estimated item position. This correlation between the combination of the timing and trajectory as detected allows the portal scanner to differentiate between multiple reads of the same item, and distinguish identical labels on multiple items. Dead reckoning may also allow the software to determine the presence of multiple distinct labels on individual items (such as an overpack label for a multi-pack of items). Additional details of an example object measurement system with timing and trajectory, three dimensional model creation, and related software are further described in U.S. App. Pub. No. 2013/0020391, hereby incorporated by reference.

As illustrated in FIG. 13, in some embodiments, the portal scanner 100 provides an arrangement of eight data readers, with four data readers 145 in the top section 110 and two data readers 140 in each of the leg sections 120, 130. Each of the data readers 140, 145 may include one or more cameras for capturing images of the item 20. In one embodiment, the data readers 145 in the top section 110 are arranged side-by-side in a single row to capture images in both the forward and rearward directions as the item 20 passes through the portal scanner 100. Similarly, the data readers 140 in the leg sections 120, 130 are arranged in a stacked configuration or column with one data reader stacked on top of the other. In such embodiments, the compact arrangement of data readers 140, 145 provides for a lean design, with the top section 110, and the leg sections 120, 130 each having a width that may range between 25 cm to 30 cm. The optional bottom scanner 50 may further include four data readers for a combined total of twelve data readers in the automated checkout system 10.

In other embodiments, the leg sections 120, 130 may each only include one data reader for a combined total of 10 data readers in the automated checkout system 10. In still other embodiments, the portal scanner 100 and bottom reader 50 may provide an arrangement for a different number of data readers depending on the size of the portal scanner 100 and the automated checkout system 5. For example, with reference to FIG. 14, the automated checkstand 10 may include a portal scanner 100 with a small profile to fit a conveyor (e.g. conveyors 15, 16 of FIG. 1) having a 12-inch width. In such embodiments, the portal scanner 100 may include six total data readers, with two data readers each on the top section 110 and bottom scanner 50, and one data reader on each of the leg sections 120, 130. In other embodiments, the portal scanner 100 can accommodate any number and arrangement of data readers as desired.

Figure 15:
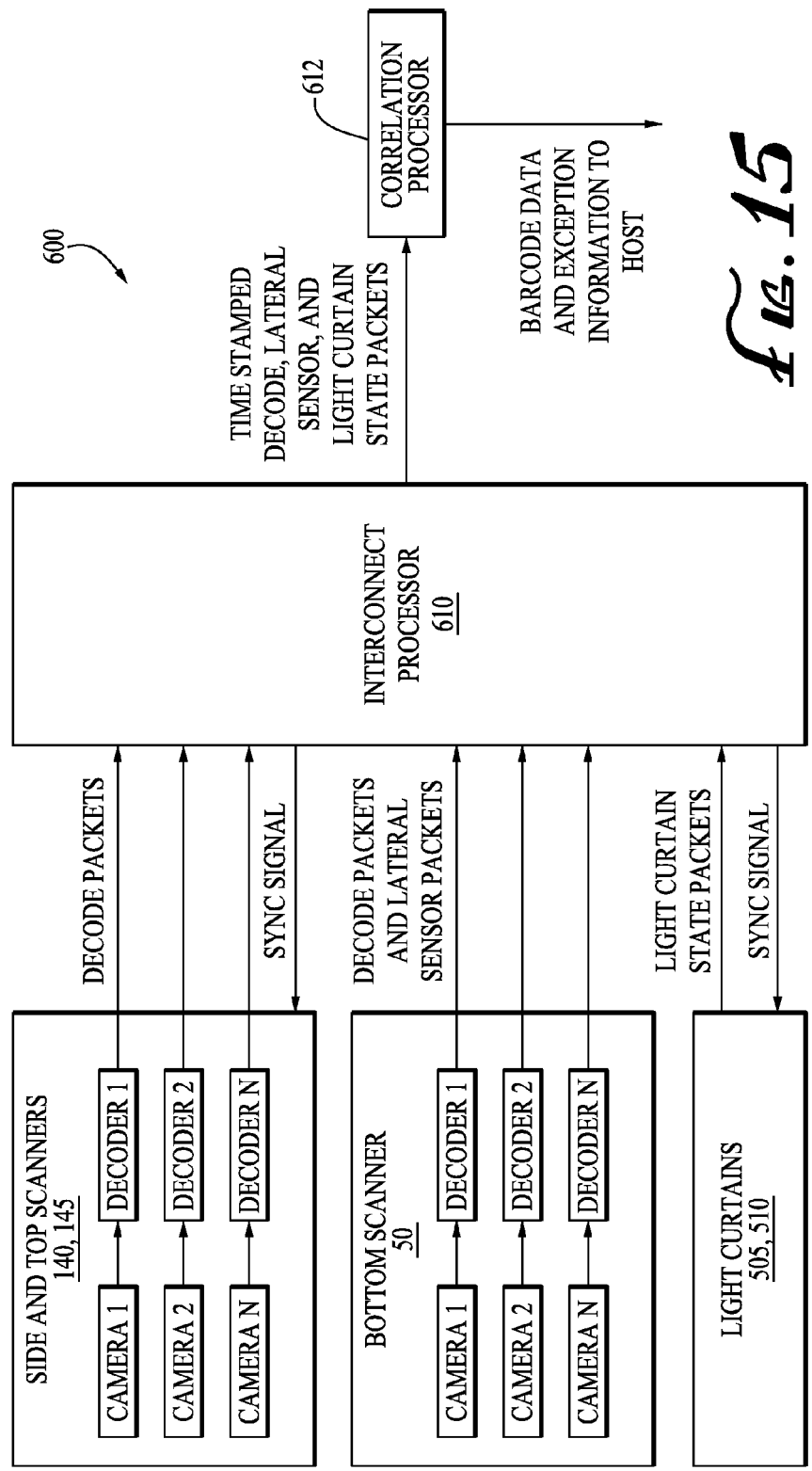
FIG. 15 is a schematic of an example processing system architecture of the scanner of FIG. 1.

FIG. 15 illustrates an exemplary system architecture 600 for processing captured data. Images from the cameras are decoded and the decoded information are sent to an interconnect processor 610. Light curtain information from the height and lateral light curtains 505, 510 is processed and the corresponding information (light curtain state packets) is also sent to the interconnect processor 610. The interconnect processor 610 applies time stamps to the packets and sends the time stamped packet data to the correlation processor 612. The correlation processor 612 generates object models (e.g., three-dimensional models of objects) from the light curtain and lateral sensor packets and correlates object data with the decode packets to determine which objects correspond to the decoded data. Successfully correlated barcode information as well as exception data is then transmitted to the POS host. Exception data corresponds to any number of events when the object models and decode packets indicate that an error may have occurred. Examples of exceptions include, but are not limited to: (a) more than one barcode is correlated with an object; and (2) no barcode is correlated with an object model; (3) a barcode is read but is not correlated with an object model. Additional details of exceptions and exception handling methods are further described in U.S. App. Pub. No. 2013/0020391.

It is intended that subject matter disclosed in portion herein can be combined with the subject matter of one or more of other portions herein as long as such combinations are not mutually exclusive or inoperable. In addition, many variations, enhancements and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. An automated checkout system for reading encoded data from an item, the automated checkout system comprising:
a portal scanner having a first leg section spaced apart from a second leg section, and a top arch section extending across from the first leg section to the second leg section;
a first imaging system housed within the top arch section of the portal scanner, the first imaging system having a first view volume directed downwardly from the top arch section and between the first and second leg sections, the first view volume including a forward-facing field of view and a rearward-facing field of view, wherein the fields of view of the first view volume cross with one another;
a second imaging system housed within the first leg section of the portal scanner, the second imaging system having a second view volume directed sidewardly toward the second leg section, the second view volume include a forward-facing field of view and a rearward-facing field of view, wherein the fields of view of the second view volume cross with one another;
a third imaging system housed within the second leg section of the portal scanner, the third imaging system having a third view volume directed sidewardly toward the first leg section, the third view volume including a forward-facing field of view and a rearward-facing field of view, wherein the fields of view of the third view volume cross with one another, wherein the first, second, and third view volumes intersect with one another to collectively form a read region of the portal scanner for reading an optical code from an item being passed through the read region; and
a conveying system operable for transporting the item through the read region of the portal scanner, the conveying system including (a) a leading conveyor section operable to receive and transport the item bearing encoded data toward the portal scanner, and (b) a trailing conveyor section operable to receive and transport the item away from the portal scanner, the trailing conveyor section spaced apart from the leading conveyor section by a gap, wherein the portal scanner is positioned between the leading and trailing conveyor sections with the top arch section of the arch aligned over the gap.

2. An automated checkout system according to claim 1, the system further comprising a bottom imaging system positioned beneath the conveying system, the bottom imaging system having a fourth view volume directed through the gap to read encoded data on a bottom side of the item through the gap.

3. An automated checkout system according to claim 2, further comprising a first light curtain formed by a plurality of sensor elements arranged on each of the top arch section and the bottom imaging system, the light curtain configured to measure a lateral position of the item relative to the first and second lateral leg sections as the item passes between the first and second lateral leg sections of the portal scanner.

4. An automated checkout system according to claim 1, further comprising a light curtain formed by a plurality of sensor elements arranged on each of the first and second lateral leg sections, the light curtain configured to measure a height of the item as the item passes between the first and second lateral leg sections of the portal scanner.

5. An automated checkout system according to claim 1, wherein the top arch section and the first and second lateral leg sections are formed as a single, monolithic structure.

6. An automated checkout system according to claim 1, wherein each of the first, second, and third imaging systems further comprises at least one imager, a lens system and associated mirrors for forming multiple image views on the imager.

7. An automated checkout system according to claim 1, further comprising an illumination module housed in at least one of the top arch section, the first leg section, or the second leg section, the illumination module including one or more light emitting diodes for illuminating the read region.

8. An automated checkout system according to claim 1, further comprising a security camera supported by the top arch section of the portal scanner, the security camera having a field of view directed toward the conveying system and operable to track the item as it moves through the portal scanner.

9. A method for reading target data via a portal scanner having a first leg section spaced apart from a second leg section, and a top arch section extending across from the first leg section to the second leg section, the method comprising:
- conveying, via a transport mechanism, an item bearing target data toward the portal scanner;
- forming a read region underneath the top arch section of the portal scanner and between the first and second leg sections by:
  - directing, via a first imaging system housed within the top arch section, a first view volume downwardly toward the transport mechanism and between the first and second leg sections, the first view volume including a forward-facing field of view and a rearward-facing field of view, wherein the fields of view of the first view volume cross with one another;
  - directing, via a second imaging system housed within the first leg section, a second view volume sidewardly toward the second leg section, the second view volume including a forward-facing field of view and a rearward-facing field of view, wherein the fields of view of the second view volume cross with one another;
  - directing, via a third imaging system housed within the second leg section, a third view volume sidewardly toward the first leg section, the third view volume including a forward-facing field of view and a rearward-facing field of view, wherein the fields of view of the third view volume cross with one another; and
  - directing, via a bottom imaging system positioned underneath the transport mechanism, a fourth view volume upwardly through a gap of the transport mechanism for capturing target data on a bottom surface of the item as the item crosses the gap;
- capturing one or more images of the item via at least one of the first, second, or third imaging systems as the item passes through the read region;
- processing the one or more images of the item to identify the target data; and
- decoding the target data based on one or more of the images.

10. A method for reading target data according to claim 9, further comprising:
- generating a light curtain via a plurality of sensors arranged in the top arch section; and
- determining, via the light curtain, a position of the item relative to the first and second leg sections.

11. A method for reading target data according to claim 9, further comprising:
- generating a light curtain via a plurality of sensors arranged on each of the first and second lateral leg sections; and
- determining, via the light curtain, a height measurement of the item relative to the transport mechanism.

12. A method for reading target data according to claim 9, further comprising illuminating the read region via one or more illumination modules, the illumination modules housed within at least one of the top arch section, the first leg section, and the second leg section.

13. A method for reading target data according to claim 9, further comprising:
- directing a field of view of a security camera toward the transport mechanism; and
- tracking, via the security camera, the item as the item moves through the read region of the portal scanner.

14. An automated checkout system for reading encoded data from an item, the automated checkout system comprising:
- a portal scanner having a first leg section spaced apart from a second leg section, and a top arch section extending across from the first leg section to the second leg section;
- a first imaging system housed within the top arch section of the portal scanner, the first imaging system having a first view volume directed downwardly from the top arch section and between the first and second leg sections, the first view volume including a forward-facing field of view and a rearward-facing field of view, wherein the fields of view of the first view volume cross with one another;
- a second imaging system housed within the first leg section of the portal scanner, the second imaging system having a second view volume directed sidewardly toward the second leg section, the second view volume include a forward-facing field of view and a rearward-facing field of view, wherein the fields of view of the second view volume cross with one another;
- a third imaging system housed within the second leg section of the portal scanner, the third imaging system having a third view volume directed sidewardly toward the first leg section, the third view volume including a forward-facing field of view and a rearward-facing field of view, wherein the fields of view of the third view volume cross with one another,
- wherein the first, second, and third view volumes intersect with one another to collectively form a read region of the portal scanner for reading an optical code from an item being passed through the read region;
- a conveying system operable for transporting the item through the read region of the portal scanner; and
- a security camera supported by the top arch section of the portal scanner, the security camera having a field of view directed toward the conveying system and operable to track the item as it moves through the portal scanner.

15. An automated checkout system according to claim 14, the system further comprising a bottom imaging system positioned beneath the conveying system, the bottom imaging system having a fourth view volume directed through the gap to read encoded data on a bottom side of the item through the gap.

16. An automated checkout system according to claim 14, wherein the conveying system including (a) a leading conveyor section operable to receive and transport the item bearing encoded data toward the portal scanner, and (b) a trailing conveyor section operable to receive and transport the item away from the portal scanner, the trailing conveyor section spaced apart from the leading conveyor section by a gap, wherein the portal scanner is positioned between the leading and trailing conveyor sections with the top arch section of the arch aligned over the gap.

* * * * *

UNITED STATES PATENT AND TRADEMARK OFFICE
CERTIFICATE OF CORRECTION

| | |
|---|---|
| PATENT NO. | : 9,053,379 B2 |
| APPLICATION NO. | : 14/504739 |
| DATED | : June 9, 2015 |
| INVENTOR(S) | : Bryan L. Olmstead and Alan Shearin |

It is certified that error appears in the above-identified patent and that said Letters Patent is hereby corrected as shown below:

Specification

In column 3, line 39, please replace "may alternately comprise" with --may alternatively comprise--.

In column 3, lines 52-53, please replace "a part an external system" with --a part of an external system--.

In column 5, line 23, please replace "cylindrical cans, irregularly shaped" with --cylindrical cans, or irregularly shaped--.

In column 6, line 36, please replace "comprising of twelve cameras" with --comprising twelve cameras--.

In column 6, line 62, please replace "a 3D volume of space" with --a three-dimensional volume of space--.

In column 7, line 36, please replace "FIGS. 4-5 illustrates" with --FIGS. 4-5 illustrate--.

In column 7, line 64, please replace "checker side 34, the trailing side" with --checker side 34 or the trailing side--.

In column 13, line 22, please replace "decoded information are sent" with --decoded information is sent--.

In column 13, line 38, please replace "(a) more than one barcode" with --(1) more than one barcode--.

In column 13, line 39, please replace "object; and (2)" with --object; (2)--.

Signed and Sealed this
Sixth Day of October, 2015

Michelle K. Lee
*Director of the United States Patent and Trademark Office*

CERTIFICATE OF CORRECTION (continued)
U.S. Pat. No. 9,053,379 B2

In column 13, line 40, please insert --and-- before "(3)".

In column 13, line 44, please replace "in portion herein" with --in portions herein--.

Claims

In column 14, line 7, Claim 1, please replace "view volume include a" with --view volume includes a--.

In column 14, line 40, Claim 3, please replace "a first light curtain" with --a light curtain--.

In column 16, line 52, Claim 16, please replace "the conveying system including" with --the conveying system includes--.